…

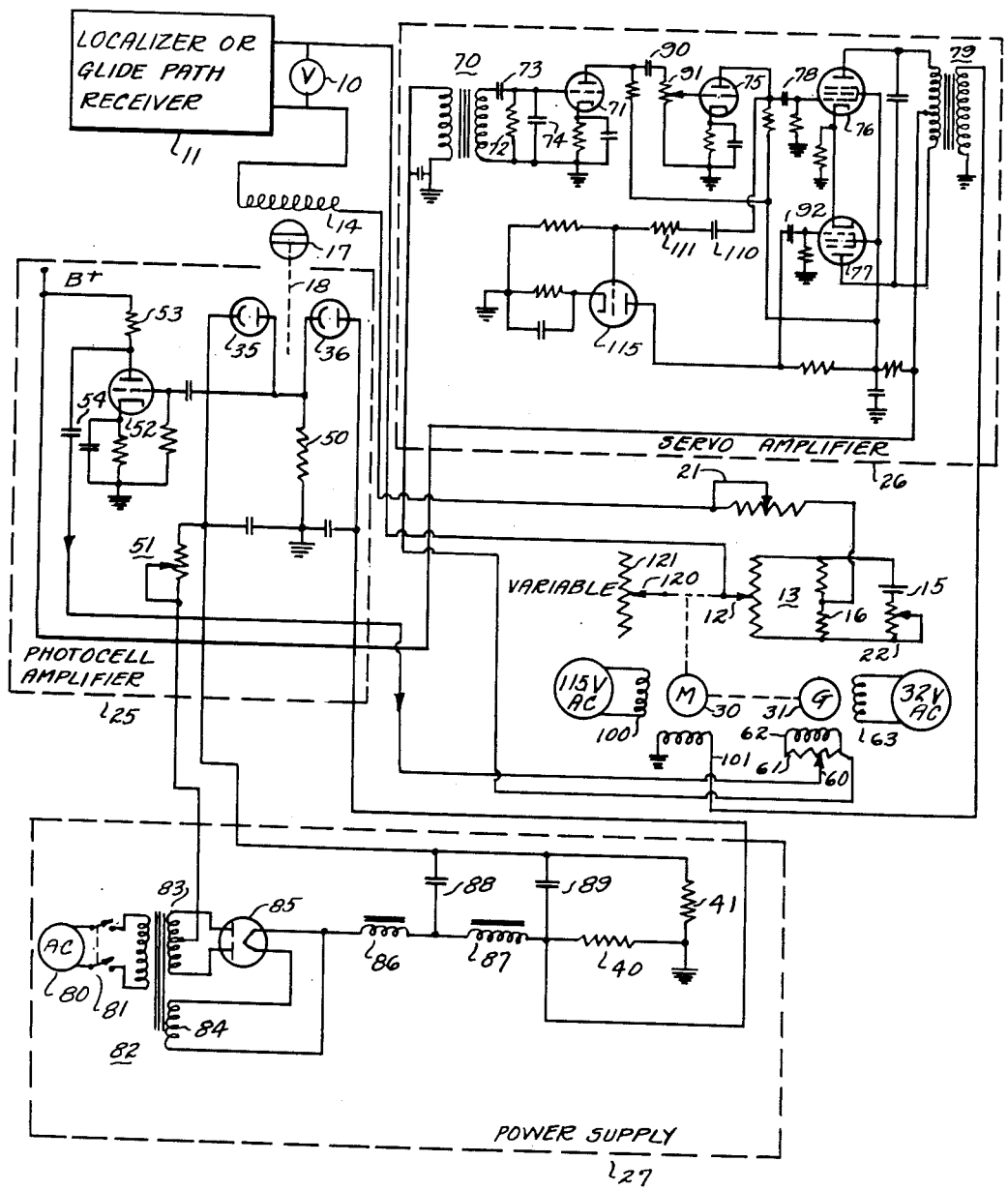

United States Patent Office

2,751,536
Patented June 19, 1956

2,751,536
SERVO SYSTEM ADAPTED FOR WEAK SIGNAL RECORDING

Lester E. Lundquist, Jr., Dayton, Ohio, assignor to the United States of America as represented by the Secretary of the Air Force Application October 25, 1951, Serial No. 253,068

4 Claims. (Cl. 318—29)

This invention concerns a system for precisely converting an electrical meter pointer position into a potentiometer shaft position.

In the past, amplifiers of various types have been used in quantitatively increasing small potentials. Where the small potentials have been characterized by fluctuations in magnitude, these fluctuations along with their significance have frequently and commonly been lost in their amplification.

The present invention is directed toward the object of retaining the significance of fluctuations in potentials of small magnitude in accomplishing their amplification to a quantity sufficient to apply them to recording and/or scoring systems.

With the above and other objects in view, that will be apparent from the following description of an operative embodiment of the present invention shown in the accompanying drawing, the single figure is an illustrative schematic diagram of that part of an electronic circuit that accomplishes a precise conversion of a fluctuating small potential into potentiometer shaft position without objectionable loss in the fluctuations of the small potential.

In the accompanying drawing an instrument 10 may be used to indicate a fluctuating potential of small magnitude which illustratively may be from a localizer or glide path receiver 11. An output of one-half of one microampere from the receiver 11 may be detectable on the instrument 10 although it may be of insufficient power to actuate a recorder or a scoring device for a permanent record.

In the circuit shown the terminals of the receiver 11 are connected in series through a first bridge potentiometer variable tap 12 of a first resistance bridge 13, through an adjustable sensitivity potentiometer 21, and through a mirror galvanometer winding 14 back to the receiver 11.

The four legs of the first resistance bridge 13 comprise the two parts of the first bridge potentiometer resistor on either side of its tap 12 with its ends connected with the ends of another resistor 16 that is tapped intermediate its ends by a connection to the sensitivity potentiometer 21. First bridge potential is supplied by a battery 15 which is connected in series with a variably adjustable scale potentiometer 22 between the first bridge direct current terminals at the junctions of the first bridge potentiometer resistor engaged by the potentiometer tap 12 and the midtapped resistor 16.

The galvanometer, of which the galvanometer winding 14 is a part, is a commonly used variety with its scale removed and with a pencil of light incident to the galvanometer mirror 17 normal to its surface when in its null position from a light source, not shown, between a pair of photoelectric tubes 35 and 36 and reflected from the mirror 17 along a return path indicated on the drawing by a dotted line 18.

A bridge potential source 15 connected across center tapped bridge resistor 16 supplies bridge voltage and, together with the fluctuating potential from the receiver 11, energizes the mirror galvanometer winding 14. Fluctuations in the potential passing through the mirror galvanometer winding 14 alters the position of the suspended galvanometer mirror 17 and the direction of its reflected light ray 18.

In addition to the association between the instrument 10 and the bridge 13, the circuitry in the accompanying drawing comprises a photo-cell amplifier 25, a servo amplifier 26, a power supply 27 and a servo system comprising a motor 30 and a generator 31.

The light ray 18 modulated at 60 cycles, from the galvanometer mirror 17 normally is directed between so that it falls equally upon two light or phototubes 35 and 36 within the photo-cell amplifier 25.

Fluctuations in the potential of the current passing through the galvanometer winding 14, that may be regarded as a direct current voltage causes the deflection of the light ray 18 toward one or the other of the light sensitive tubes 35 or 36 with an accompanying increase in the potential of the output from the tube intercepting the light ray 18 and a decrease in the potential of the output from the other tube.

A second bridge circuit within the photo-cell amplifier 25 and the power supply 27 comprises as one of its sides the light tube 36 in series with a power supply first resistor 40 to ground and as its other side the other light tube 35 in series with power supply second resistor 41 to ground. The junction of the light tubes 35 and 36 is applied to ground through a photo-cell amplifier resistor 50.

The power supply 27 is self-contained and supplies from a 60 cycle alternating current source 80 rectified in a full wave rectifier 85 and filtered direct current operating voltages for the photosensitive tubes 35 and 36. A direct current voltage measured between the cathode of the tube 35 and the anode of the tube 36 at their junctions with the resistors 41 and 40, respectively as the bridge direct current terminals preferably is 150 volts and is adjustable at a photo-cell amplifier potentiometer 51.

When the amount of light that is permitted to strike both phototubes 35 and 36 is equal, no potential variation develops at the junction of the anode of the tube 35 and the cathode of the tube 36 or any potential impressed upon the resistor 50 from both tubes is equal and opposite in phase and consequently no alternating current voltage is developed across the resistor 50.

When the light from the beam 18 that strikes one of the phototubes 35 or 36 is greater than the light that strikes the other phototube, the photo-cell amplifier bridge becomes unbalanced and a voltage is developed across the common resistor 50, the phase and the amplitude of which is determined by the direction and magnitude of the unbalance. This developed voltage is applied to the capacitor coupled grid of the voltage amplifier tube 52. B+ anode voltage is supplied to the amplifier tube 52 through an anode resistor 53.

The voltage from the light tubes 35 and 36, is amplified in the tube 52. The plate of the amplifier tube 52 is coupled through a capacitor 54 in series with a generator field winding potentiometer variable tap 60 with an input transformer 70 of the servo amplifier 26. The potentiometer tap 60 engages its potentiometer resistor 61 that shunts one field winding 62 of the servo generator 31. The other servo generator field winding 63 illustratively has 32 volts alternating current applied across it. The time lag of the galvanometer mirror 17, as well as the stability of the circuitry, is met by the adjustments of the sensitivity potentiometer 21 and the setting of the selsyn generator potentiometer tap 60.

The servo amplifier 26 amplifies the initiating voltage as received from the unbalance in the photo-cell amplifier bridge circuit of the phototubes 35 and 36. The direction of the unbalance in this photo-cell amplifier bridge controls the phase of the initiating voltage. The voltage applied to this photo-cell amplifier bridge from the power supply 27 illustratively is 60 cycle alternating current provided by the alternating current power source 80 when the ganged switches 81 are closed to apply line current to the power supply transformer 82. A full wave rectifier 85, in a secondary winding 83 of the power transformer 82, is connected with a power filter comprising the choke coils 86 and 87 and the pair of capacitors 88 and 89 with the capacitor 89 shunting the series connected resistors 40 and 41 that are grounded at their junction. A center tap on the power transformer secondary winding 83 is connected to the variable tap on the photo-cell amplifier potentiometer 51. A second secondary winding 84 of the power transformer 82 is connected across the cathode of the rectifier tube 85.

Since the power supplied at the power line 80 and at the servomotor field winding 100 is alternating current of illustratively 60 cycle, the polarity is constantly reversing 120 times per second. A necessary center phase difference is required in the servomotor windings 100 and 101 for the proper operation of the servomotor 30.

Servo amplifier input voltage from the transformer 70 is amplified in the servo amplifier tubes 71 and 75 and in the push-pull amplifiers 76 and 77 to provide the servo amplifier output at the secondary winding of the servo amplifier output transformer 79. Within the servo amplifier 26 the plate of the amplifier 71 is connected through a capacitor 90 and an adjustable potentiometer 91 to the grid of the amplifier tube 75. The plate of the amplifier tube 75 is coupled through a capacitor 78 with the control grid of the first push-pull amplifier tube 76. The plate of the amplifier tube 75 is also connected to the control grid of the second push-pull amplifier tube 77 through a capacitor 110, a resistor 111, a phase inverter tube 115 and a capacitor 92. The plates of the push-pull inverter tubes 76 and 77 are connected to the opposite ends of the primary winding of the servo amplifier output transformer 79. B+ voltage is supplied to the center tap of the primary winding of the servo amplifier output transformer 79 and through series connected resistors to the plate of the phase inverter tube 115. Output from the servo amplifier output transformer 79 is applied to the field winding 101 of the servomotor 30. This application of servo amplifier output voltage with its controlled phase will cause the motor to operate in a clockwise direction where the mirror galvanometer light ray 18 strikes one of the light tubes 35 or 36 and in a counterclockwise direction when the light ray 18 strikes the other of the light tubes. The servomotor 30 will not operate in either direction when the light ray 18 falls equally on both of the light tubes 35 and 36.

The rotor of the servomotor 30 is ganged mechanically, as indicated by dash lines, with both the rotor of the servo generator 31 and with the bridge galvanometer variable tap 12. The bridge galvanometer variable tap 12 is coupled mechanically as an end result of the operation of the present invention with a desired variable device of ample torque to actuate an electronic recorder indicated in the accompanying drawing as a galvanometer tap 120 on its resistor 121 by means of which the small fluctuating voltage across the terminals of the instrument 10 is converted into a mechanical movement providing a true reproduction of the fluctuations in the small potentiometer at the instrument 10.

In the system comprising the motor 30 and the generator 31, the motor drives the generator in the usual manner. The generator potentiometer 60, 61 is connected in series between the junction of the anode of tube 35 and the cathode of tube 36 of the light cell bridge in the photocell amplifier 25 and the amplifier tube 52 and the input transformer 70 of the servo amplifier 26.

The potential from the generator 31 that is induced into its winding 62, as modified by the adjusted setting of the potentiometer tap 60 on its potentiometer winding 61, is fed as input into the servo amplifier input transformer 70. A feed back potential from the generator 31, as operated by the motor 30, passed through the servo-amplifier circuit 26 consequently effects the potential applied to the motor winding 101 and hence the operation of the motor 30 and consequently as an end result the positioning of the variable tap 120 on its resistor 121. A sensitivity potentiometer 21 serves to balance out irregularities in the circuit and a scale potentiometer 22 serves as a scale for the adjustment of the first bridge potential supplied from the potential source 15.

It is to be understood that the circuitry, and the particular associations of the components that have been chosen to illustrate the disclosed operative embodiment of the present invention, may be changed, substituted and modified somewhat such that they still accomplish similar or parallel results without departing from the scope of the invention that is disclosed herein.

What I claim is:

1. A fluctuation significance preserving amplifier of electrical potential of small magnitude, comprising a source of fluctuating electrical potential of small magnitude, a light producing first circuit receiving as input the fluctuating electrical potential of small magnitude from the source thereof and having as its output a light beam displaced in direction by the potential fluctuations, a first resistor bridge in said first circuit provided with a potentiometer having a tap to which the fluctuating electrical potential of small magnitude from the source thereof is applied and the potentiometer tap being adjustable on the potentiometer for altering the potentiometer adjustment in said first resistor bridge, a permanent record producing second circuit receiving as its input the potential fluctuation modulated light beam output from the first circuit, electronic means in said second circuit for converting the light beam direction displacements derived from said first circuit into electrical signal modulated in conformity with the fluctuations in the electrical potential of small magnitude at the source thereof, and field winding modulated servo-system means in said second circuit for converting the modulated electrical signal into mechanical tap adjustments on the potentiometer in said first resistor bridge and also into mechanical recordings preserving the fluctuation significance in the small magnitude potential from the source thereof.

2. A fluctuation significance preserving amplifier of electrical potentials of small magnitude, comprising a source of a fluctuating electrical potential of small magnitude, a first circuit by which the electrical potential fluctuations are converted into light beam deflections, and a second circuit converting the light beam deflections into mechanical displacements returned to modify the electrical energy conducted by the first circuit, the first circuit comprising a first resistor bridge consisting of a plurality of resistors, an adjustable tap contacting one of the first bridge resistors, and an illuminated mirror bearing galvanometer winding conducting and deflectible by the fluctuations of the small magnitude electrical potential to provide a galvanometer mirror reflected light beam deflected in conformance with the fluctuations of the electrical potential of small magnitude as output from the first circuit, and an amplifier second circuit deriving its input as light energy from the light beam reflected from the galvanometer mirror of said first circuit and having a mechanical output applied to the first bridge adjustable potentiometer tap in the first circuit and imparting thereto mechanical displacements conforming in significance with the fluctuations of the small magnitude potential at its source, the second circuit comprising a light responsive second bridge intercepting on series connected light sensitive tubes the first circuit light beam and converting beam deflections into potential magnitude variations, amplifier means connected in series in the second circuit with the second bridge for amplifying the potential magnitude variations therefrom, a servo system wherein a servomotor drives both a servo generator and the adjustable tap engaging the tapped bridge resistor in the first bridge of the first circuit, a servo generator first field winding conducting to be influenced by the amplified output from the second bridge in the second circuit, potentiometer resistor means shunting the servo generator first field winding and the potentiometer resistor means adjustably contacted by a potentiometer tap conducting the amplified output from the second bridge in the second circuit, and a servomotor first field winding transformer coupled with the first field winding of the servo generator for deriving its input therefrom in the modification thereby of the operation of the servomotor and consequently of the tap position on the tapped resistor of the first bridge in the first circuit.

3. A small electrical potential fluctuation significance preserving apparatus connected with a source of fluctuating electrical potential, the apparatus comprising a first circuit, and a second circuit, the first circuit comprising in series connection an illuminated mirror bearing galvanometer winding conducting the fluctuating electrical potential and the galvanometer mirror providing a light beam displaced in direction and extent by the galvanometer winding conducted potential fluctuations, and a resistor bridge consisting of a plurality of resistors of which one resistor is variably contacted by an adjustable tap and is shunted by an adjustable direct current source, the second circuit comprising in series connection a light sensitive bridge consisting in part of a pair of resistance shunted series connected light sensitive tubes accessible to the light beam from the galvanometer mirror in the first circuit and the tubes having in common a cathode-anode electrode junction at which appears a potential fluctuating in sense and in amplitude and in time with the fluctuating electrical potential input into the first circuit, and a servo system consisting in part of a field winding actuated servomotor coupled mechanically with and driving both a field winding actuated servo generator and the adjustable tap contacting the tap-contacted resistor in the first resistor bridge in the first circuit, and a potentiometer resistor shunting one of the servo generator field windings and adjustably contacted by a potentiometer tap capacitively coupled in series with the light sensitive tubes electrode junction and with one end of the servo generator resistor shunted field winding transformer coupled with one end of one of the servomotor field windings such that the performances of both the servomotor and of the servo generator are influenced by fluctuations in the small electrical potential input into the first circuit and through the servomotor correspondingly adjusts the sense and the magnitude of the position of the first circuit resistor bridge adjustable tap on its bridge resistor.

4. An electronics system for precisely converting an electrical meter pointer position into a potentiometer shaft position, comprising a potential source having a potential output of fluctuating sufficient magnitude for deflecting an electrical meter pointer position, a first circuit conducting the fluctuating potential from its source through a plurality of components connected in series and comprising an illuminated light reflecting galvanometer, a sensitivity potentiometer, and a first bridge, the galvanometer comprising a winding for conducting the fluctuating potential and the winding bearing an illuminated mirror reflecting a light beam which is deflected in direction and in amount by the polarity and the amplitude of the fluctuating potential conducted by the galvanometer winding, the sensitivity potentiometer comprising a potentiometer resistor across which the fluctuating potential is applied and the galvanometer winding contacted by a variable tap for shunting out a desired amount of the sensitivity potentiometer resistance, and the first bridge comprising a first bridge resistor mid-tapped as a first bridge contact for the conduction of the fluctuating potential and a second bridge resistor shunting the first bridge resistor and the second bridge resistor contacted by an adjustable tap providing a second bridge contact for the conduction of the fluctuating potential, and an adjustable direct current potential source shunting both the first and the second bridge resistors, and a second circuit receiving as input the deflections of the first circuit galvanometer mirror reflected light beam and as output a servomotor actuated displacement of the adjustable tap on the first circuit first bridge second resistor, the second circuit comprising a light sensitive second bridge receiving the first circuit galvanometer mirror reflected light beam and converting the beam light energy into electrical energy varying in polarity and in relative amplitude with the fluctuating potential input into the first circuit to provide the output for the second bridge, a photocell amplifier connected with and amplifying the electrical output from the second circuit second bridge, a servo system with a generator field winding connected with the photocell amplifier to receive and to be influenced by the amplified output from the second circuit second bridge and with a generator rotor mechanically coupled with a servo system motor rotor driven by a pair of field windings of which one motor field winding is indirectly connected with to receive from and to be influenced by the amplified output from the second circuit second bridge after its passage through the servo system generator field winding, and a potentiometer tap positioning shaft mechanically coupled with the first bridge second resistor adjustable tap and mechanically coupled with to be operated by the second circuit servo system motor rotor in conformity with the fluctuating potential input into the first circuit.

References Cited in the file of this patent

UNITED STATES PATENTS

| | | |
|---|---|---|
| 2,113,436 | Williams | Apr. 5, 1938 |
| 2,139,474 | Shepard | Dec. 6, 1938 |
| 2,286,820 | Lenchon | June 16, 1942 |
| 2,295,960 | Moore | Sept. 15, 1942 |
| 2,375,159 | Wills | May 1, 1945 |
| 2,413,128 | Wills | Dec. 24, 1946 |
| 2,424,193 | Rost et al. | July 15, 1947 |